United States Patent [19]

Smith

[11] 3,972,449
[45] Aug. 3, 1976

[54] POWER FEEDING APPARATUS
[75] Inventor: Bernard Francis Smith, Easton, Pa.
[73] Assignee: Aeonic Press Company, Belvidere, N.J.
[22] Filed: Aug. 13, 1975
[21] Appl. No.: 604,424

[52] U.S. Cl. .............................. 222/64; 222/197
[51] Int. Cl.² .................................. B67D 5/14
[58] Field of Search .......... 222/197, 217, 234, 244, 222/52, 64, 56

[56] References Cited
UNITED STATES PATENTS

| | | | |
|---|---|---|---|
| 759,259 | 5/1904 | Flood | 222/217 X |
| 1,266,706 | 5/1918 | Nickle | 222/197 |
| 2,381,505 | 8/1945 | Lindholm | 222/56 |
| 2,842,827 | 7/1958 | Nickelson | 222/197 |

Primary Examiner—Allen N. Knowles
Assistant Examiner—Hadd Lane
Attorney, Agent, or Firm—Darby & Darby

[57] ABSTRACT

A powder feeding apparatus in which a feed shoe, open at the top and bottom, is movable along a feed plate from a remote powder filling location to a position directly overlying a cavity into which the powder is to be fed. The apparatus includes a wire grid suspended in a horizontal plane near the bottom of the feed shoe and coupled to means for reciprocating it relative to the feed shoe to dispense fluent powdered material into the cavity. A photocell scanning system is provided for controlling the desired powder level and for detecting powder supply exhaustion.

10 Claims, 4 Drawing Figures

POWER FEEDING APPARATUS

This invention relates to apparatus for automatically dispersing particulate material and more specifically to a movable powder feed shoe including special means for promoting the continuous uniform flow of powdered materials from a powder feed shoe into a cavity.

The uniform distribution of predetermined amounts of finely divided particulate materials, especially those in powdered form, has long been a problem in several fields. In particular, the powder metallurgy art (in which precision parts such as bearings are produced by blending fine particle size metal powders, compacting the cold mixture to the required contour and then sintering or heating them in a controlled atmosphere to bond the contacting surfaces of the particles and obtain the desired properties) requires the repeated, accurate distribution of powdered materials into die cavities from a powder feeding device. Because of the small particle sizes involved, the powders have a tendency to bridge (i.e. clog or compact) in the outlet ports or orifices of the feeding mechanism. This is, of course, unacceptable since it requires time-consuming effort to unclog the orifices. In an effort to overcome the clogging problem, fine particle materials have been entrained from a storage container through tubes of progressively smaller diameter to a dispensing or feeder tube which is mechanically vibrated to afford continuous particle flow. While such devices alleviate the clogging problem to some extent (e.g., they usually cannot handle different particle size materials and blends of dissimilar powders), there are drawbacks resulting from their use. One significant disadvantage is that they do not discharge the particulate substance at a uniform flow rate into the die. This is important, especially in the powder metallurgy art, in order to provide a constant bulk density of material in the die. It is difficult to repeatably fill die cavities with an accurate predetermined quantity of material when the flow rate into the cavity cannot be maintained substantially uniform. Hence, this type of dispensing apparatus is not suitable for repeatable filling operations since it is difficult to accurately control the amount of material being dispensed.

In another prior art dispensing system, the powder storage hopper is agitated to prevent packing of the powder material and the resulting clogging of the discharge orifice. This is unsatisfactory since many powder compositions are blends of various powders having different sizes and densities. Continuous unregulated agitation can result in segregation of the blend constituents into distinct layers containing a single particle size which may then be separately distributed into the die cavity thereby eliminating all the beneficial physical properties of the final compact attributable to its being formed from a powder blend. Moreover, this system also does not have any provision for maintaining a fixed level of material in the powder feed shoe thereby insuring the distribution of a constant bulk density of material into the die.

These and other problems have limited the accuracy and usefulness of previous powder feed arrangements.

The principal object of the present invention is therefore to provide a novel and improved powder feed arrangement for delivering a controlled amount of particulate material to a cavity in a uniform and repeatable fashion.

Another object of the present invention is the provision of an arrangement to repeatably supply a predetermined amount of flowable particulate material to one or more cavities on a continuous basis and without excessive powder buildup in the feed shoe or die cavity area.

A further object of the invention is to prevent powder bridging or premature powder compaction in a powder-feeding system and to minimize segregation of blended powdered materials caused by excessive vibration or manipulation.

Another aspect of the invention is to provide a powder feed system for incorporation as part of an automated powder metallurgy compacting apparatus and to prevent tooling or machine damage when the powder supply is exhausted.

A more specific object of the invention is to provide a movable particle dispensing feed shoe containing a grid which may be reciprocated independently of the shoe.

These and other objects, features and advantages of the invention will appear more fully from the following description taken in connection with the appended drawings, in which.

Figure 1:
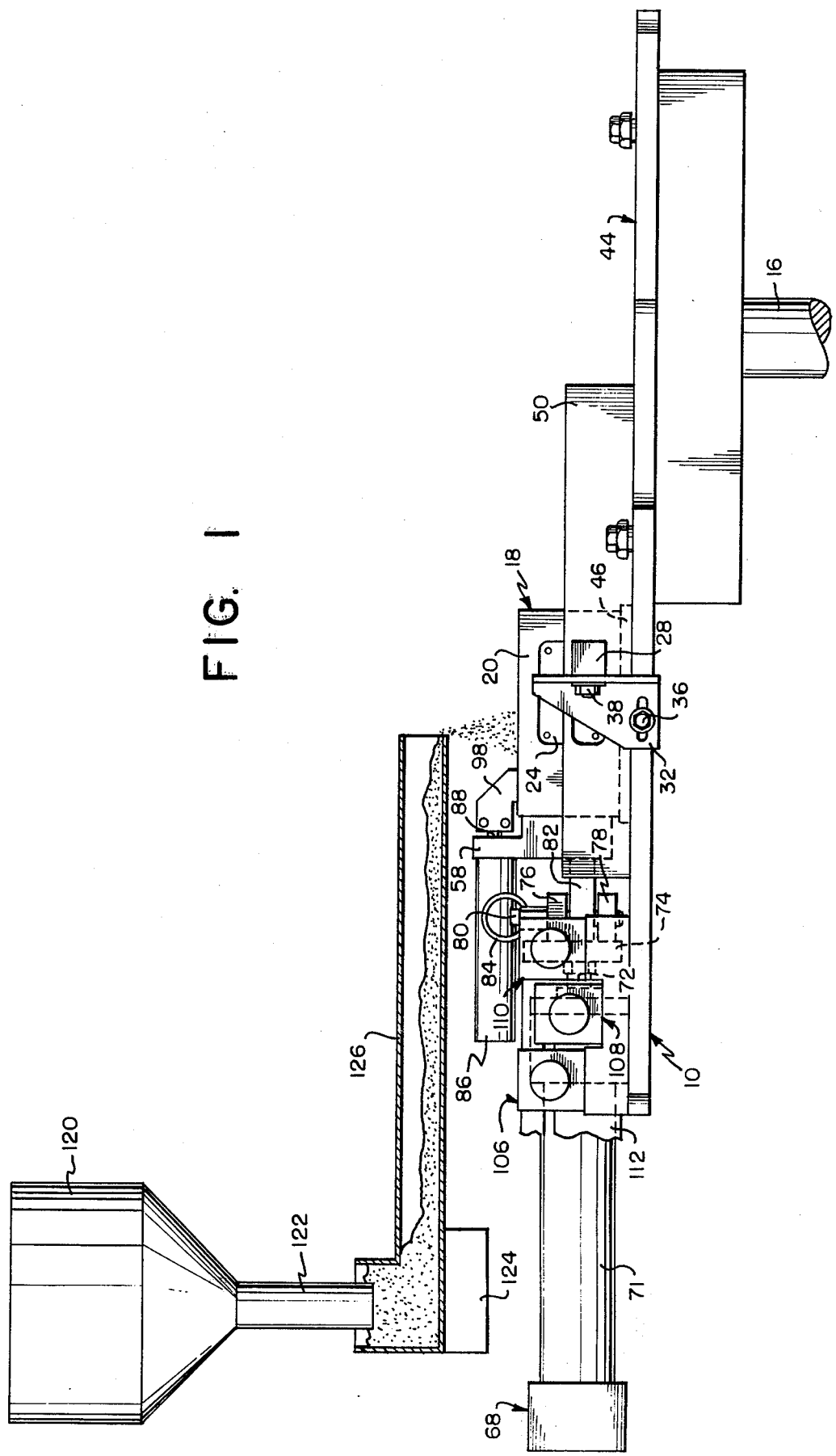
FIG. 1 is a side elevational view of an automated powder feeding apparatus according to the invention, with the movable feed shoe in the retracted or filling position.

Referring now to FIG. 1 of the drawings, there is illustrated a powder feeding apparatus 10 according to the invention. For purposes of explanation, it should be understood that the apparatus will generally be employed as part of a conventional automated powder compacting press (not illustrated) of the type used for compacting powder blends into precision parts. The instant invention is employed to deliver a predetermined quantity of powdered material into the bore or cavity 12 of die 14. It will be appreciated that the size and powder capacity of bore 12 may be varied by adjusting the movable die floor 16 either up or down. The powdered materials will be compacted in the die by an upper (not shown) punch which is matably pressed into the die cavity 12 after it has been filled with powder as will be described herein.

The powder feed arrangement of the invention includes a powder feed shoe 18 having an essentially box-like configuration and being open at the top and bottom. Although illustrated in the drawings in a generally square shape, the geometrical configuration of the shoe is not critical and may be varied to suit the particular pressing apparatus and die with which it is to be employed. Thus, rectangular, oval and circular feed shoes can be interchangeably employed in the invention. The sidewalls 20 and 22 of the shoe have transparent areas or ports 24 and 26, respectively. The ports, which are coaxially aligned with one another, are sealingly covered by plexiglass or similar transparent material which will permit a light beam to pass from a conventional photoelectric light source 28 through the feed shoe to a standard photocell 30 for the purpose of detecting the head (or vertical level) of material in the shoe. The photocell 30 and light source 28 are mounted on movable brackets 32 and 34, respectively, which may be moved or adjusted either horizontally into predetermined positions or vertically by means of fastener nuts 36, 38, 40 and 42. A more detailed description of the function of the photoelectric circuit will be apparent from the operational description provided later on.

The bottom of feed shoe 18 sealingly communicates with the upper surface of feed plate 44 by means of a wear plate 46. The wear plate is usually made of a wear-resistant material such as Micarta and easily slides along the surface of the feed plate 44 without permitting particulate material to escape from the feed shoe 18 by passing underneath and between its lower surface and the upper feed plate surface when the shoe is in motion. The feed plate 44 extends to and surrounds the lip of a die aperture 48 in which a die is usually located.

The powder feed shoe 18 can travel back and forth guided by U-shaped tracks 50 and 52 by means of spring-loaded rollers 54 and 56 which are journalled in the ends of support bar 58.

Figure 4:
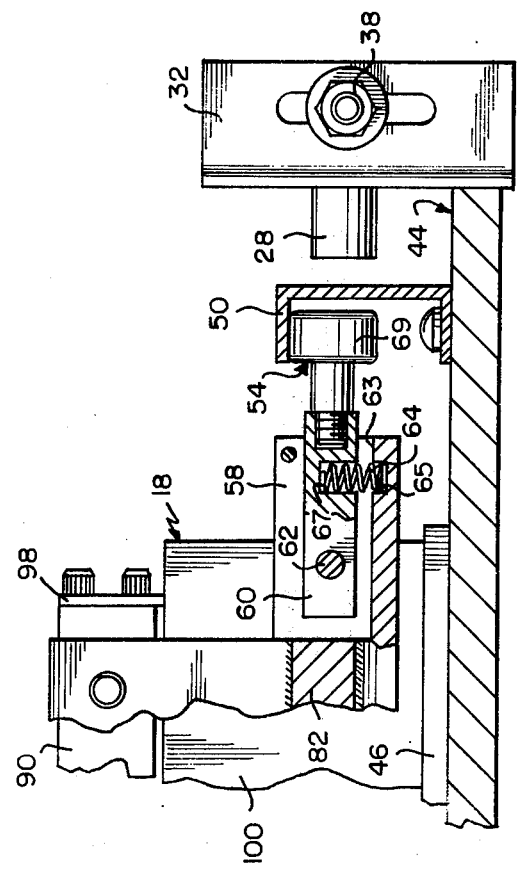
FIG. 4 is an enlarged transverse sectional detailed view taken on line 4—4 of FIG. 2.

Referring to FIG. 4, it will be seen that roller 54 is journalled in a pivotable bar 60 which moves around a pivot pin 62 mounted within a cavity 63 formed in support bar 58. The bar 60 is located in a cavity of support bar 58 and is biased in an upward direction by means of coil spring 64 which is held at its lower extremity in a depression 65 formed in the floor of support bar 58 and has its upper extremity enclosed in hollow chamber 67 in the pivotable bar 60. The spring bias serves to maintain the roller surface 69 against the upper surface of the U-shaped track and thereby enable relatively smooth movement of the bar 58 and feed shoe 18 which is connected thereto along the track. The spring also serves to bias the powder feed shoe 18 and wear plate 46 into sealing communication with the upper surface of feed plate 44. The feed shoe is permanently mounted on support bar 58 by means of fasteners 65 and 66.

A movable indexing apparatus 68, preferably a hydraulically operated cylinder 71, is permanently affixed to one end of the feed plate by mounting lugs 70. The indexing means need not be a hydraulic cylinder and any other mechanical apparatus (e.g., motor-driven extension system) which will controllably drive the feed shoe 18 along tracks 50 and 52 may be utilized. The cylinder 71 includes a piston rod 72 which may be retracted within the cylinder bore or extended outwardly in a horizontal plane coaxial with the cylinder bore. The forward end of piston rod 72 is attached to a linkage yoke 74 having upper and lower apertured link members 76 and 78, respectively. The apertures in the respective link members are designed to accept two removable linkpins 80. A mating yoke piece 82 bears two apertures of the same diameter as the apertures in upper and lower links 76 and 78 and is permanently attached to support bar 58. The apertures in yoke piece 82 can be coaxially aligned in between the corresponding apertures in pieces 76 and 78, and linkpins 80 inserted to create a movable linkage between the support bar 58 and piston rod 72. The operator may remove the linkpins for the purpose of uncoupling when servicing either the hydraulic cylinder or the powder feed shoe by pulling upward on O-rings 84 which are pivotally secured in the upper portion of pins 80. Thus, the powder feed shoe 18 is removably coupled to a hydraulic cylinder which serves to move the feed shoe parallel to and along the upper surface of the feed plate. In operation, the cylinder extension and retraction is controlled by the operator (or by an electrical sequencing circuit) to move the feed shoe 18 along the U-shaped guide rails 50 and 52 until the opening in the bottom of the shoe is positioned over the die cavity 12.

Referring again to FIG. 1, it will be seen that an air cylinder 86 is mounted transversely on the upper portion of support bar 58. The piston rod 88 of the air cylinder extends through an aperture in the upper portion of support block 58 and is fastened to a drive plate 90. Guide pins 92 and 94 are fixedly mounted in the upper portion of the support block 58 and protrude forward to cooperate with corresponding apertures in drive plate 90. A pair of offset brackets 96 and 98 are fastened to the lateral edges of drive plate 90. The arms or offsetting portions of the brackets 96a and 98a are of sufficient length to insure that when the piston rod 88 is fully withdrawn, the vertical bracket extensions do not contact the rear feed shoe wall 100. A grid 102 is fixed between the lower horizontal extensions of brackets 96 and 98. Although illustrated in the preferred embodiment comprising a plurality of closely spaced rods, the grid need not take this form and may consist of a wire network such as a mesh or screen. It will be appreciated that the screen is directly connected by means of brackets 96, 98 and drive plate 90 to the piston rod extension 88 which may be reciprocated when air cylinder 86 is actuated. Cylinder 86 contains two integral 3 way pilot valves (not shown) which are operatively connected with an air shuttle valve 104 to reciprocate the piston rod 88 in a short back-and-forth stroke in a horizontal plane substantially parallel to the upper surface of the feed plate. This action, in turn, is transmitted by means of drive plate 90 to grid 102 which is reciprocated back and forth within the boundary, and without contacting the walls, of feed shoe 18. The volume of air which is admitted to the pilot valves through the air shuttle valve may be regulated by the operator to control the frequency at which the piston rod 88 is reciprocated by the number of back-and-forth strokes per unit of time. Although it is preferred, the invention is not limited to use of an air cylinder as the means for reciprocating the suspended grid, and other suitable devices such as a motor-driven eccentric cam bearing against drive plate 90 or an electromagnetic vibrating device may be employed for this purpose. The reciprocating air cylinder 86 may be selectively actuated and shut off either manually at the option of the operator or, in the case of automatic operation, according to a predetermined electrical sequence as will be explained herein.

As part of the provision for automatically controlling the sequence and duration of operation in the present powder feed system, cam-operated limit switches 106, 108, 110 are mounted alongside one another; however, switch 108 is mounted closer to the surface (i.e., lower) of feed plate 44 than switches 106 and 110 which are located at the same height with respect to the feed plate surface. Each switch consists of a body portion (106a, 108a and 110a, respectively) containing the electrical switching elements and circuit connections. A forwardly extending tapered extension of the main body portion holds a spring-loaded trigger arm (106b, 108b and 110b, respectively) carrying a freely rotatable roller (106c, 108c and 110c, respectively) on the outer end. The trigger arms can each be depressed to close or open a circuit in the respective switch. A rearwardly extending cam plate 112 is attached to a lateral edge of linkage yoke 74 and is indexed back and forth by piston rod 72 in the direction of travel and along with feed shoe 18 and its accompanying reciprocating apparatus. The outward facing surface of cam plate 112, that is to say, the surface facing switches 106, 108 and 110, carries corresponding adjustable cams 114, 116 and 118. Each cam is held in and projects from a separate track 114a, 116a and 118a along which it can be moved horizontally and positioned to rest in a predetermined location. The respective cams are designed to actuate a corresponding one of the switches 106, 108 and 110 as cam plate 112 is moved back and forth in association with feed shoe 18 and yoke 74. In order to facilitate actuation of the corresponding switch as contact is established in each direction of plate travel, the contact surface of each cam is tapered. Thus, the corresponding switch trigger will be urged backward into the actuated position as the respective rotatable switch roller rides up the sloping cam contact surface as the cam travels past the switch position. Each cam remains in a fixed position on cam plate 112, as the plate is urged forward, and, depending upon its stationary track location, will move its corresponding switch trigger backward into the actuated position at a different point in the forward and rearward movement of the feed shoe 18 with respect to die cavity 12. Although the invention is not limited to this arrangement, switch 106 is designed and mounted to operate in response to cam 114, switch 108 to operate in response to cam 118 and switch 110 to operate in response to cam 116.

A frustoconical powder hopper 120 is mounted above the feed plate that serves as a storage container for the powdered materials which are to be fed through the feed shoe 18. An intermediate cylindrical discharge tube 122 extends downward from the bottom of the powder hopper to connect it with a vibratory powder feed apparatus 124 which is operatively attached to a horizontal conveyor tube 126. Upon operation of the vibratory apparatus 124, powder discharged from hopper 120 through tube 122 is moved along the conveyor tube 126 due to the vibrating action created by the mechanism of the vibrating unit 124. The outlet end of conveyor tube 126 is positioned to lie directly over the open top of feed shoe 18 when the shoe is resting in its retracted position (piston rod 72 is withdrawn). Powder is thus discharged from the exit port of tube 126 into powder feed shoe 18. The photocell scanning system serves the dual purpose of controlling an adjustable level or head of powder in the feed shoe and protecting the punch tool by monitoring for exhaustion of the fluent material supply in the shoe. In the latter case, irreparable tool damage may occur if the punches are allowed to penetrate and compress in an empty die cavity.

The function and interrelation of the respective switches and actuating cams with the other powder feed system components will be better understood in conjunction with the following description of the overall operation of the powder feed system of the invention.

Figure 2:
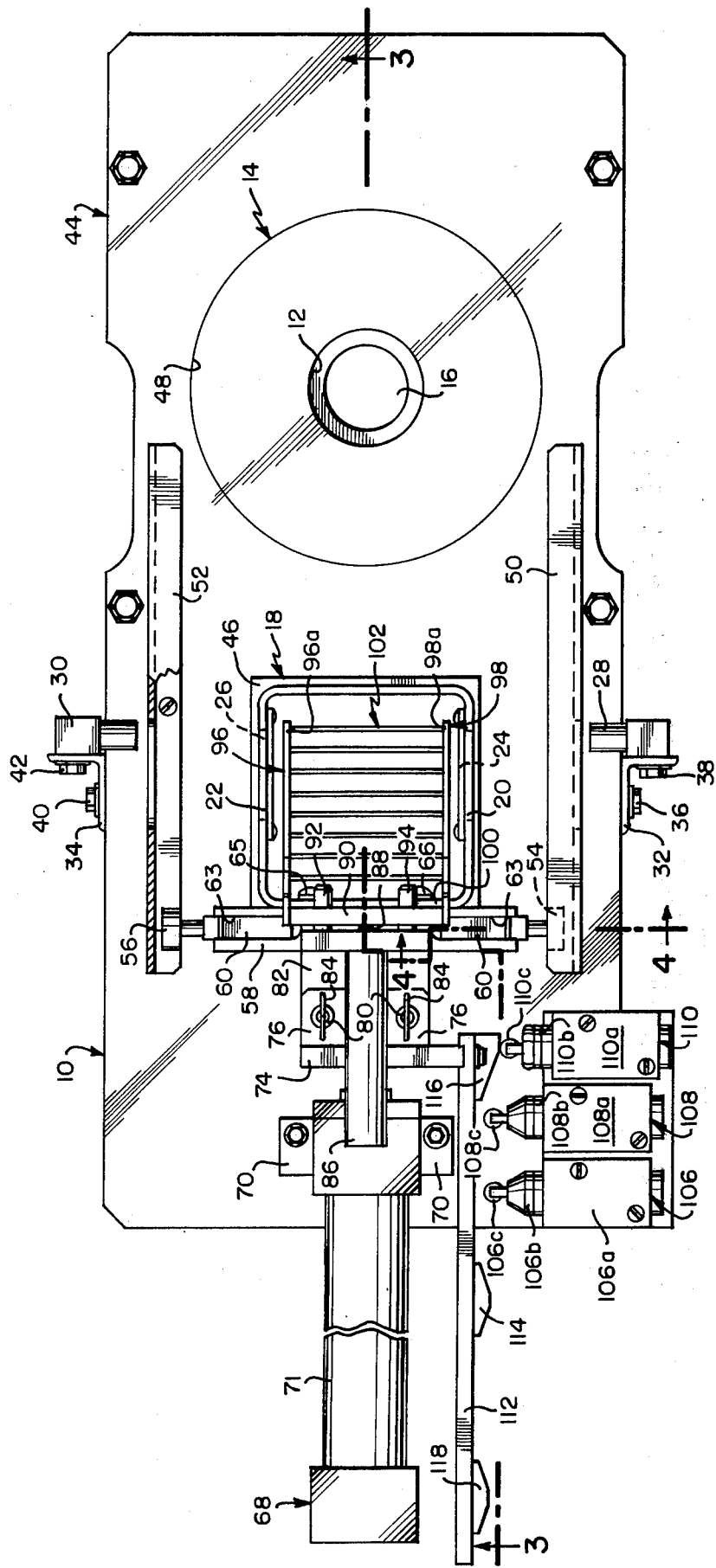
FIG. 2 is a top plan view of the apparatus of FIG. 1.
Figure 3:
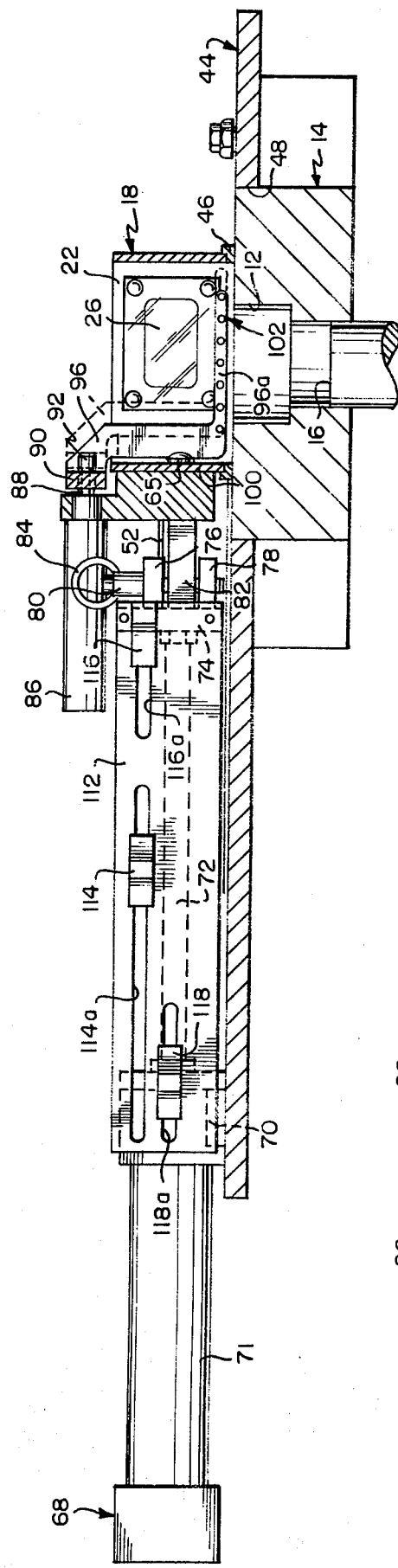
FIG. 3 is an enlarged transverse detailed view of the movable feed shoe apparatus taken substantially on line 3—3 of FIG. 2.

Briefly summarized, fluent material flows by gravity from powder hopper 120 through the discharge tube 122 and is driven by vibrator 124 through the horizontal conveyor 126 from which it falls into the feed shoe 18. The level of powder in the shoe is measured by photocell 30 which has been adjusted vertically to a predetermined height by means of nut 42 to receive light transmitted from the photoelectric light source 28 through the transparent ports 24 and 26. The height of source 28 is adjustable by means of nut 40 to a position corresponding to the desired powder head level which it is desired to maintain in shoe 18. After a predetermined powder level has been reached, the vibratory feeder 24 is shut off thereby halting the powder drop from the output orifice of tube 126. During this interval, powder feed shoe 18 is in the position illustrated in FIG. 1 (i.e., fully retracted position). If the powder head in the feed shoe does not reach the present level determined by the coincident elevation of photocell 30 and electric light source 28, the photocell scanning system which is interconnected to the vibratory feeder control through a master electrical control circuit (not shown) will disable all the machine functions except the vibratory feeder mechanism. The feeder 24 will remain in operation and continue to transmit powder through the conveyor tube into the feed shoe until the desired level is obtained. Until such time as the preset powder level has been reached, thereby cutting off the beam of light source 28 from photocell 30, all other machine functions are disabled and neither the reciprocating air cylinder 86 nor the hydraulic cylinder 71 can be actuated. When the photocell circuit 30, 32 has determined that the preset powder level has been achieved, a pathway is closed through the master electric control circuit (not shown) to actuate hydraulic cylinder 71 to extend piston rod 72 and index feed shoe 18 forward along the upper surface of feed plate 44. Switch 110 is in the actuated (depressed) position from the preceding cycle. As the feed shoe approaches the die 14, cam 114 will urge switch trigger 106b backwards to actuate switch 106 to halt the forward movement of the shoe at a position behind the edge of die 14, which is predetermined by the position in which cam 114 is located in track 114a of cam plate 112. This primary feed shoe stop is provided to facilitate the removal of the compacted part formed in the preceding cycle. The configuration of many formed parts allow for removal from the die area by parts pushers or parts lifters which can be attached directly to the front wall of the feed shoe. For parts which require auxiliary apparatus for removal from the die area, switch 106 also functions to synchronize the auxiliary apparatus with the press motions. After the preceding part has been removed, the bore for die cavity 12 is generated by moving die 14 upward to a preset position. In traveling upwards, the die cavity generating mechanism actuates a microswitch (not shown) to restart the forward movement of piston rod 72 and feed shoe 18. The cylinder continues to drive feed shoe 18, associated support bar 58 and air cylinder 86 forward until the shoe is directly over the die cavity. At this point, cam 118 urges trigger 108b of switch 108 backward to close a circuit which halts forward movement of the feed shoe and actuates the shuttle valve to admit air pressure alternately to the integral pilot valves contained in air cylinder 86 thereby causing piston rod 88 to begin reciprocating grid 102 back and forth. The frequency of reciprocation is controlled by regulating the volume of air admitted to the air shuttle valve. Higher reciprocation frequencies on the order of several hundred cycles per minute will be used in the case of single phase powders in which there is little danger of segregating discrete phases, while lower reciprocation frequencies are generally employed with blends of different particles to avoid segregation of the constituent elements to discrete particle phases. The position of cam 118 can be adjusted to make contact with switch 108 when feed shoe 18 is either directly centered over the die cavity 16 or when the leading or trailing walls of the feed shoe overlie the edge of the die cavity, by stationing the cam at a preselected position along track 118a. As illustrated in FIG. 2, cam 118 is positioned to contact trigger 108b and permit roller 108c to ride up the inclined cam surface and close switch 108 when feed shoe 18 is directly centered over the die cavity. Switch 108 also controls the circuit to a timing device (not illustrated) through the main electrical control circuit (not illustrated) which determines the dwell or residence time the feed shoe 18 will remain in position above the die cavity 12. The dwell time can be adjusted in advance by the operator based upon the particular material or die cavity configuration to be filled, also taking into account the tendency of the granulated material to be dispersed by the reciprocating grid. If the timer is set to zero, the shoe will not dwell over the die cavity and will be retracted rearwardly by piston rod 72 and cylinder 71. The timer also serves to re-engage the electrical circuitry of switch 110.

From the time grid reciprocation is commenced by the actuation of switch 108, air cylinder 86 commences to reciprocate grid 102 back and forth in a path substantially horizontal to the upper surface of feed plate 44. The powder deposited in the feed shoe 18 may have partially compacted at the bottom of the shoe and will not flow uniformly into the die cavity 12 until grid reciprocation has commenced and will continue to flow uniformly so long as reciprocation action is maintained. On conclusion of the timed dwell period, air cylinder 86 is stopped thereby ending reciprocation of the grid 102, and the auxiliary electrical timer signals hydraulic cylinder 71 to begin withdrawal of piston rod 72, thereby retracting feed shoe 18 towards its resting position beneath the discharge orifice of conveyor 126. As the cylinder is drawn back toward the resting position, the inclined actuating surface of cam 116 urges switch trigger 110b thereby actuating switch 110, as shown in FIG. 2 of the drawing, which limits the rearward travel of feed shoe 18 and unlocks an auxiliary circuit (not illustrated) and initiates operation on the main die punch which will compress the powdered material previously deposited within die cavity 12 by dropping down under pressure from above the cavity and compressing the powdered material held therein. Switch 110 also actuates the photoelectric monitoring circuit 28, 30 to measure the powder depth in the feed shoe. In normal operation, when the shoe has returned to the resting position after dispensing material into the die cavity, the powder depth in the shoe will have fallen to a lower level and the light beam transmitted by source 28 will pass uninterrupted through the transparent ports into the eye of photocell 30. This will, in turn, actuate an appropriate pathway in the master control circuit (not illustrated) placing the vibratory unit 124 into operation and causing powder to be discharged from the mouth of the tube 126 into the underlying feed shoe 18. When the powder level in the shoe has risen and interrupts the light beam, vibratory feeder 124 controlled by the photoelectric circuit is deactivated and the master control circuit (not illustrated) initiates a new powder feed sequence. It will be appreciated that the photoelectric light source 28 and photocell 30 on the corresponding brackets 32 and 34 are adjustable vertically by means of slotted mounts in order to permit selection of a depth range of powder in shoe 18.

The wire grid 102 may be programmed via the master control circuit (not illustrated) to reciprocate continuously or only when the feed shoe 18 is in the filling position over die cavity 12. The particular type of operation selected will depend upon the nature or condition of the powdered material being used. In addition to permitting a smooth continuous flow of granular material from the feed shoe into the die, the reciprocating grid serves the purpose of repulverizing powdered materials which may have become compacted or lumpy in the shoe as well as sieving the pulverized material uniformly into the cavity.

During the time the photocell 30 is receiving the light beam generated by light source 28, all other machine functions are locked out and the machine cannot operate thereby affording maximum protection against tool damage by pressing an empty die cavity.

The photocell scanning system serves the dual purpose of controlling an adjustable level or head of powder in the feed shoe and providing for tool protection in the event of an empty system. Moreover, should all the powder in hopper 120 have been exhausted, the photoelectric scanning system will prevent the apparatus from commencing another cycle until such time as the powder supply has been replenished.

Although operation of the invention has been described in conjunction with the use of a master electric control circuit which is wired in a well-known manner (using conventional relays and switches), the invention need not be operated in this preprogrammed fashion, and each separate function, i.e., indexing, grid reciprocation, die cavity generation, feeder dwell time and the like, may be controlled manually by the operator.

What is claimed is:

1. A powder dispensing apparatus which comprises a powder feed shoe, a wire grid suspended in a horizontal plane in a lower interior portion of said feed shoe, means for moving said feed shoe in a horizontal plane from a retracted position to a preselected extended position, and means for reciprocating said wire grid in a horizontal plane including means for varying the rate at which said grid is reciprocated relative to said feed shoe.

2. A powder dispensing apparatus according to claim 1 wherein the bottom of said feed shoe is open and in sealed communication with the upper surface of an underlying feed plate and said feed plate extends to and surrounds the lip of a die cavity.

3. A powder feed dispensing apparatus as recited in claim 2 wherein said powder feed shoe is removably coupled to said means for moving said shoe and has a substantially rectangular configuration and includes translucent ports mounted opposite one another in opposing walls of said shoe.

4. A powder dispensing apparatus as recited in claim 3 wherein said wire grid is attached to a reciprocating apparatus mounted on a support for said feed shoe.

5. A powder dispensing apparatus as recited in claim 4 wherein said means for moving said feed shoe in a horizontal plane includes a hydraulic cylinder affixed to said feed plate, a pair of opposed tracks for guiding the travel of said shoe from said retracted position to said extended positions, said hydraulic cylinder being directly connected through a linkage to a support for said feed shoe.

6. A powder dispensing apparatus as recited in claim 5 including means for biasing said powder feed shoe into sealing communication with said feed plate.

7. A powder dispensing apparatus as recited in claim 6 further including a single adjustable photoelectric apparatus for transmitting and receiving a light beam through said ports to detect the presence of a predetermined powder head in said shoe said photoelectric apparatus including means for disabling said means for moving said feed shoe in a horizontal plane and said means for reciprocating said grid in the absence of said predetermined powder head.

8. A powder dispensing apparatus as recited in claim 7 wherein the means for horizontally reciprocating said wire grid relative to the feed shoe is an air-driven reciprocating piston apparatus.

9. A powder dispensing apparatus as recited in claim 8 further including a plurality of switches mounted on an upper surface of said feed plate parallel to the path of travel of said feed shoe and means for selectively actuating said switches mounted on and moving with said linkage.

10. A powder feed apparatus comprising a feed plate which extends to and surrounds the lip of a cavity, a powder feed shoe permanently positioned over said feed plate, the bottom of said shoe being open and biased into sealing communication with the upper surface of the plate,
   a wire grid suspended in the lower portion of said feed shoe parallel to the upper surface of said feed plate, and
   means for selectively moving said feed shoe from a retracted position remote from said cavity and in which it may receive a finely divided powder supply from a fixed overhead powder supply source to a first extended position behind the edge of said cavity, and then to a second extended position directly overlying said cavity, photoelectric means coupled to said powder source for providing a fixed powder head in said shoe prior to reciprocating said grid,
   and means connected to said feed shoe for reciprocating said wire grid at a variable reciprocation rate in a horizontal plane within and relative to said feed shoe.

* * * * *